United States Patent

[11] 3,588,246

[72] Inventor Georges July
    Pinner, Middlesex, England
[21] Appl. No. 669,427
[22] Filed Sept. 21, 1967
[45] Patented June 28, 1971
[73] Assignee Eastman Kodak Company,
    Rochester, N.Y.
[32] Priority Sept. 30, 1966
[33] Great Britain
[31] 43,912/66

[54] PHOTOGRAPHIC COLOR PRINTER
    8 Claims, 3 Drawing Figs.
[52] U.S. Cl. .................................................. 355/38,
                                                356/173, 356/218
[51] Int. Cl. ...................................................... G03b 27/76
[50] Field of Search .......................................... 355/38;
                                                    356/173, 218

[56] References Cited
    UNITED STATES PATENTS
    3,100,815  8/1963  Drake et al. ................... 355/38X
    3,120,782  2/1964  Goddard et al. ............... 355/38X Primary Examiner—Samuel S. Matthews
Assistant Examiner—Richard A. Wintercorn
Attorneys—Robert W. Hampton and James J. Wood ABSTRACT: A method and apparatus of masking color records with an exposure pattern that has been electronically corrected for producing color prints from photographic color records. Three flying spot scanning devices having blue, green or red filters, respectively, positioned in front of the face of each of the devices synchronously scan a photographic color record. The filtered light of the flying spot scanning devices is modulated by the color content of the photographic color record. A portion of the modulated light transmitted by the color record is directed to three photoelectric sensing devices each arranged to sense a different color of the transmitted light to provide respective signals representative of the intensity of each color. The respective signals are stored during one scansion of the color record by the flying spot scanning devices and thereafter applied to a correction system wherein the blue, green and red color components are individually corrected to compensate for various conditions in the photographic color record and the copy material. The corrected signals are then fed back to control the intensity of the flying spot scanning devices during a second scansion of the photographic record at which time the color print is made.

GEORGES JULY
INVENTOR.

BY James J. Wood
Robert W Hampton
ATTORNEYS

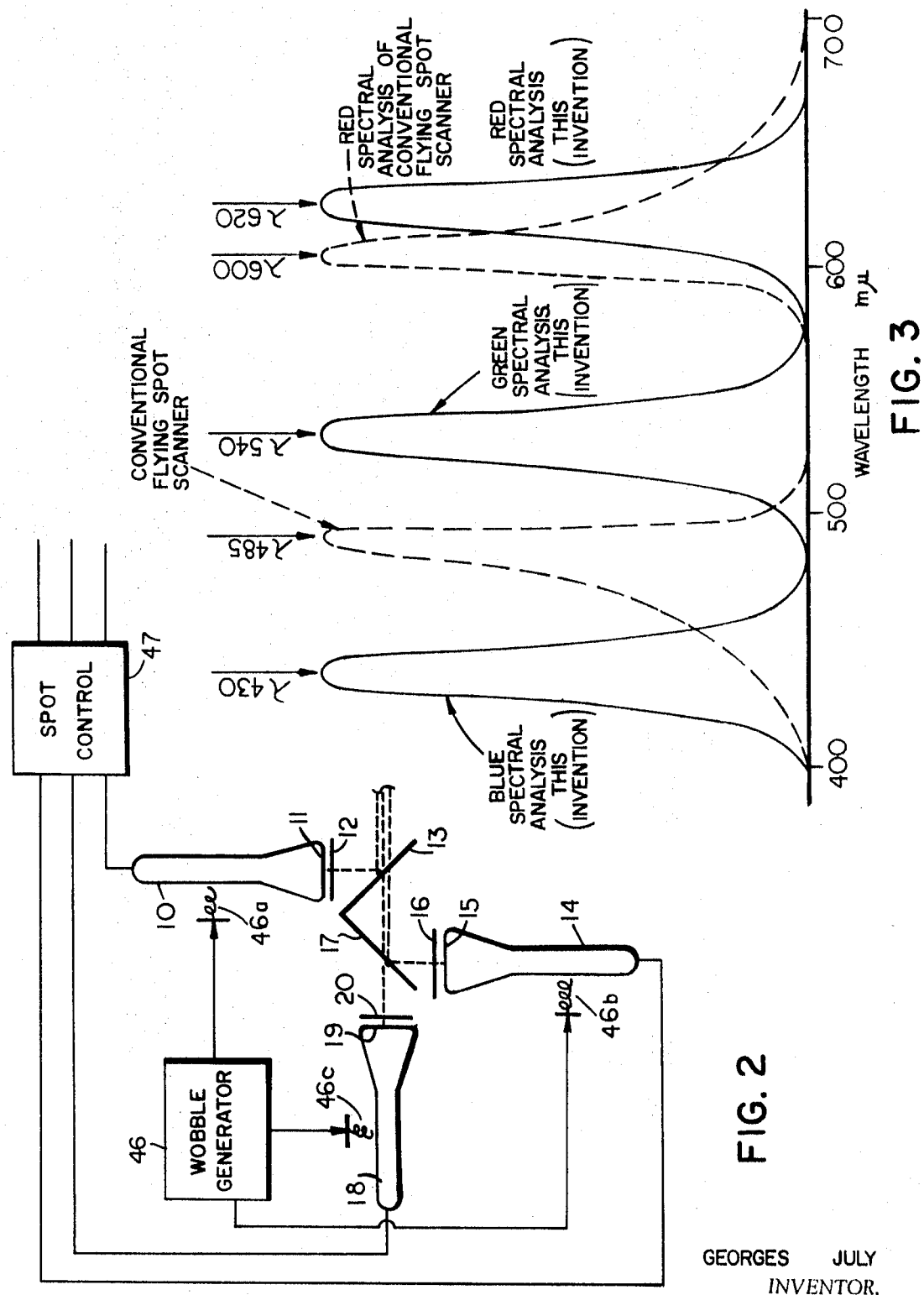

3,588,246

PHOTOGRAPHIC COLOR PRINTER

BACKGROUND OF THE INVENTION

1. Field of the Invention

This invention is directed to the field of printing color prints from a masked color record. Basically, the invention is directed to the correcting of original color records for dye deviations by feeding back to the source of light exposure, a signal which will vary the intensity of the respective basic colors in the light pattern to provide optimum exposure of the positive original; i.e. to mask the original. More particularly, the invention advances a design which will facilitate filtering the light emanating from the source of light exposure to allow only the passage of light of very precise wavelengths. The invention is especially applicable to the field of printing copies from still or motion picture transparencies. In addition, the invention concerns the direct printing of opaque originals such as reflection prints as well as separation negatives for use in subsequent photomechanical printing processes.

2. Description of Prior Art

The broad concept of masking original color records with a variable intensity light pattern to correct for dye deviations in the color record is known. The disclosure in U.S. Pat. No. 2,757,571 (issued Aug. 7, 1956) is representative of the prior art in this field.

At present there are also systems for making black-and-white prints from a black-and-white negative by scanning the black-and-white negative with light from a cathode-ray tube which has been corrected for contrast. An example of this technique is shown in U.S. Pat. No. 2,927,520 (issued Mar. 8, 1960). The system employs a contrast corrector circuit which is provided with a phototube located behind the black-and-white print. The phototube converts the light incident upon it into signals which are fed through a corrective matrix and then to the black-and-white cathode-ray tube to vary its intensity and to thereby correct for contrast.

In each of the present systems for masking exposed originals, the single flying spot scanner tube is used. Therefore, the present systems do not lend themselves to a filtering arrangement which will allow passage of a very limited band of wavelengths.

SUMMARY OF THE INVENTION

Accordingly, it is an object of the present invention to provide an apparatus and method by which colored transparencies can be rapidly reproduced with precise corrections for color.

Another object of the invention is to provide a system wherein 1:1 copies of 35 mm. originals or smaller format prints corrected for color density can be made rapidly.

A further object of the present invention is to provide an apparatus and method wherein 8 mm. and Super-8 or 16 mm. Super-8 reduction prints corrected for color density can be made rapidly.

An additional object of the present invention is to provide an electronic apparatus for masking color records which uses three cathode-ray tubes which spot scan a color transparency simultaneously.

Three high resolution flying spot scanner tubes emitting blue, green and red light respectively are arranged to spot scan an original color record in unison. The blue, green and red light emanating from each respective flying spot scanner tube passes through a different filter positioned in front of each flying spot scanner tube. Each filter passes only light of the color corresponding to its related scanner tube. The light from the filters is passed to an arrangement of dichroic mirrors which appropriately direct the blue, red and green light to the original color record. The light passing through the original color record then passes through a partially reflecting mirror to expose the photosensitive color copying stock with a small component being deflected to a color correction system.

In the color correction system, the light is split into blue, green and red components and converted to electrical signals, the magnitude of which is a function of the transmittance of each color. These electrical signals are then converted to logarithmic signals and passed through a matrix wherein they are corrected for unwanted dye absorption in the particular materials being used in the original and copy. The corrected logarithmic signals are then converted to linear signals which may be passed through a second matrix wherein they can be corrected for the lack of negative lobes due to the sensitizing dyes used in the original and/or copying material. A final correction is then made to the signals by passing them through gamma correctors followed by polarity inverters which correct for contrast. The finally corrected signals are then fed back to the respective flying spot scanner tubes to vary the intensity of the light emanating therefrom, thereby effectively masking the color record to afford optimum exposure of the copying stock.

BRIEF DESCRIPTION OF THE DRAWING

The invention will be described further, by way of example, with reference to the accompanying drawings wherein;

FIG. 2 shows the flying spot scanners of the present invention provided with a wobble generator and means for spot control.

FIG. 3 shows the spectral analysis of a conventional scanning arrangement compared with the spectral analysis of the scanning arrangement of the present invention.

DESCRIPTION OF THE PREFERRED EMBODIMENT

Figure 1:
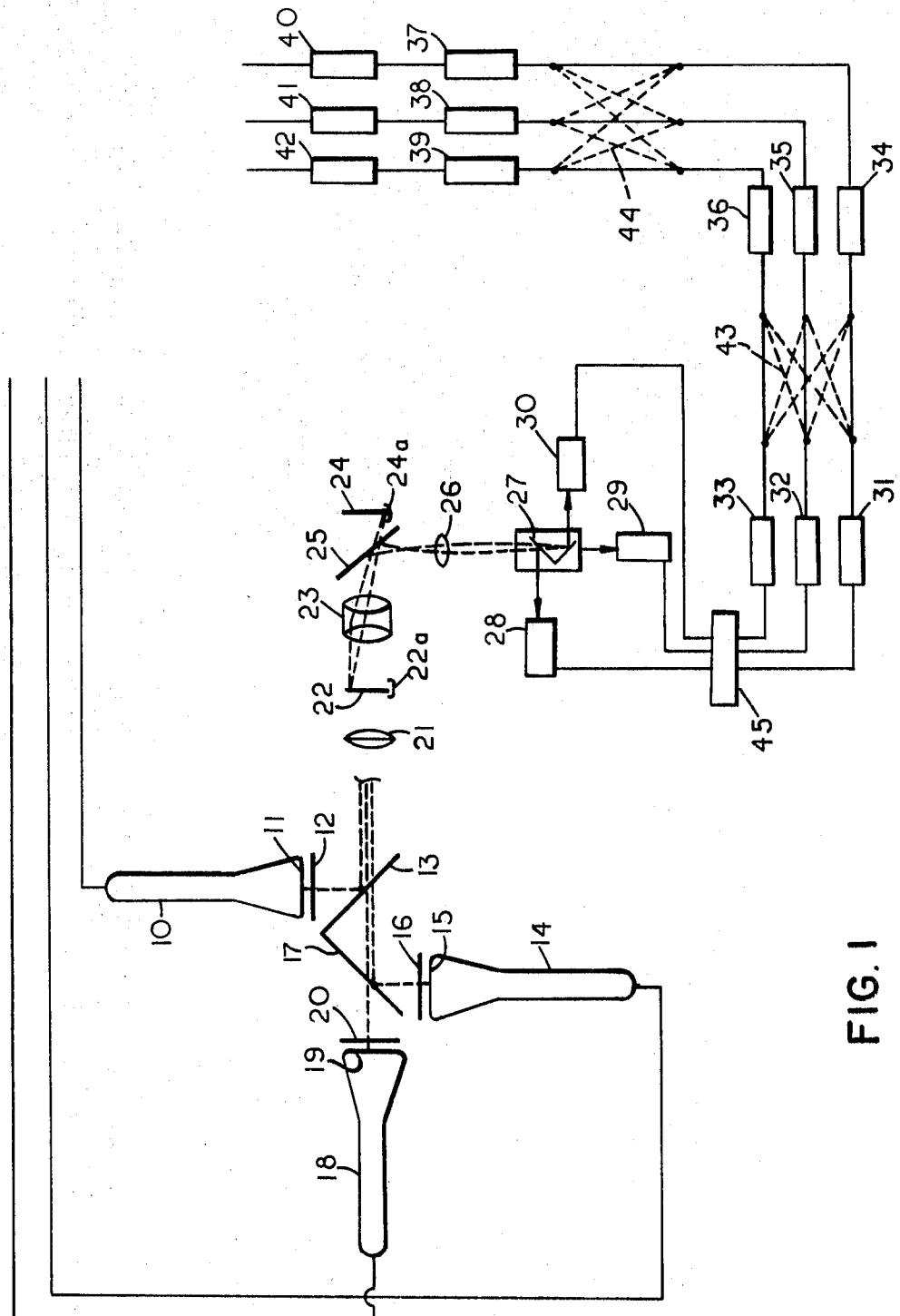
FIG. 1 shows schematically, one form of apparatus according to the present invention.

As best seen in FIG. 1, the apparatus of the present invention includes a plurality of means for scanning a color record or a photographic transparency 22, which apparatus comprises a three-tube flying spot scanner having three high resolution cathode-ray tubes 10, 14 and 18 which emit blue, green and red light, respectively, and are synchronized to display a 1024 line raster in unison. The first high resolution cathode-ray tube 10 has a 'P' phosphor (Ferranti Limited's phosphor classification) coated on its internal end face 11 to provide a source of blue light. In addition, in order to restrict the light to the optimum blue light, a blue filter 12 is positioned in front of the cathode-ray tube 10. Further refinement of the blue light is afforded by a dichroic mirror 13 which reflects blue light and transmits green and red light of respective wavelengths peaking at 430 m$\mu$, 540 m$\mu$, 620 m$\mu$. The filter 12 and the dichroic mirror 13 are chosen to form a combination at least as restrictive and yet as efficient as a "Wratten" 47B Filter.

The second high resolution flying spot scanner tube 14 has a D3 phosphor (Ferranti Classification) coating on its internal end face 15 to provide a source of green light therefrom. To further control the green light being transmitted, a green filter 16 is positioned in front of the flying spot scanner tube end face 15 and a dichroic mirror 17 is arranged to reflect the light from the flying spot scanner tube 14 through the dichroic mirror 13. The dichroic mirror 17 reflects green light and transmits red light of the respective wavelengths indicated above.

The third high resolution flying spot scanner tube 18 has a yttrium vanadate phosphor coating on its internal end face 19 to provide a source of red light. A "Wratten" 29 Filter 20 is positioned in front of the cathode-ray tube 18 to insure that the red light emanating therefrom is of the particular red wavelength mentioned above.

The arrangement of filters 12, 16 and 20 in combination with dichroic mirrors 13 and 17 facilitate scanning the transparency 22 with blue, green and red light of respective wavelengths peaking at 430 m$\mu$, 540 m$\mu$, and 620 m$\mu$ rather than the wavelength at which the light from conventional flying spot scanners peak as seen in the graphic display presented in FIG. 3.

The dichroic mirrors 13 and 17 combine the light from the three flying spot scanner tubes 10, 14 and 18 and direct the individual blue, red and green lights to a field lens 21 which images the light into the image bearing plane of the original transparency 22 mounted in a holder 22a. The thus illuminated original transparency 22 is then imaged by a lens 23 into the plane of the light sensitive copying material 24 suitably supported on a holder 24a. In this way, the plurality of means for scanning the color record are adapted to produce a color image with at least a portion of the light being scanned.

Interposed between the lens 23 and the light sensitive copying material 24 (or the position where such copying material would be located) there is provided a mirror 25 which, in the preferred embodiment, is semitransparent. A portion of the light passing through the lens 23 is reflected by the mirror 25, collected by a lens 26 and passed to a beam splitter 27 which, by means of various dichroic mirrors or a prism arrangement, splits the composite collected light into light of the three component colors; i.e. blue, green and red light.

The colored light from the beam splitter 27 passes to respective photoelectric devices or photodetectors which are constituted by photomultipliers 28, 29 and 30, each of which is responsive to a different one of the colored lights. The photomultipliers 28 and 30 which receive the blue and green light are equipped with conventional antimony-cesium photocathodes having an S 11 spectral response. The photomultiplier 29 which receives the red light is equipped with a trialkali photocathode having an S 20 spectral response. In practice, it has been found that an E.M.I. Electronics Ltd. 9558 photomultiplier is particularly applicable for use in the red channel.

The response of photomultipliers 28, 29 and 30 is proportional to the transmittance of the blue, green and red light passed through the record. Density of light is a logarithmic function of transmittance. Therefore, in order to obtain a signal corresponding to the density of each color, the signals from the photomultipliers must be converted logarithmically. The signals, corresponding to the blue, green and red coloring of the transparency, must then be submitted to means for modifying the respective signals from the photoelectric means in accordance with a predetermined program. The modifier's means includes logarithmic amplifiers 31, 32 and 33, respectively for converting the signals to logarithmic values which are then matrixed to correct for unwanted dye absorptions of the particular materials.

The terms for the matrix 43 are chosen specifically for the dye of the color record being copied. It should also be noted that in the system of the invention, the choice of Ferranti 'P' blue emitting phosphor can lead to advantageous matrix values and better signal-to-noise ratios than in conventional single tube flying spot scanners. By way of example, matrices of the type shown in U.S. Pat. No. 2,757,571 (issued Aug. 7, 1956) can be used.

Subsequently to the matrixing arrangement, the signals are fed through antilog amplifiers 34, 35 and 36, which reconvert the signals to linear signals. It is preferred that the signals be then passed through a second matrix 44 wherein they are additionally modified to correct for the lack of negative lobes due to sensitizing dyes used in the original and/or copying material.

Thereafter, the signals are then modified by gamma correctors 37, 38 and 39, followed by polarity inverters 40, 41 and 42. Gamma correction is necessary to correct tone or contrast. Basically, the contrast correction of the gamma corrector is required to compensate for the transfer characteristics of the flying spot display of the cathode-ray tube. To reduce the contrast of the photographic copy and thus to insure a correct tone reproduction, the flying spot light intensity must be made to rise to the shadows of the picture. It has been found that the most efficient method of achieving this is to pass the signals to gamma correctors 37, 38 and 39, followed by polarity inverters 40, 41 and 42, an arrangement for insuring correct tone reproduction which is well known in the color television industry. In addition, the transfer characteristics of the inverters must be chosen with due regard to the stock on which the photographic copy is being made since the contrast between the original color record and the copying material must be corrected so that the transfer functions of the two materials are fitted.

Means are then employed to feed back the respective modified signals to spot scanner tubes 10, 14 and 18 to modulate the intensity of the exposing phosphors and thereby produce the effect of an unsharp mask which corrects for both color and tone reproduction errors in the color record. The high frequency detail is not carried by the electronic chain in this invention due to the deliberate omission of aperture correction after the photomultiplier. This correction is not necessary as the normal image produced in the optical part of the apparatus carries the necessary high frequency detail information without losses inherent in the color television system.

To maintain the quality of the electronic masking introduced by the modified color television chain in this invention it is necessary to insure that no crosstalk occurs between the exposing phosphors and the layers of a copying stock. Careful attention to the characteristic of the light output of each of the phosphors, of each of the filters and/or each of the dichroic mirrors assembling the light, and to the characteristic of the copying film spectral sensitivities will insure this. In particular, the combination of a copying film such as "Ektachrome-X," a "Ferranti" 'P' phosphor, and a "Wratten 29" filter will insure that the blue and red light affect only the layers intended to be exposed by light of these colors.

In the operation of the invention, the transparency 22 to be copied is located at the original station 22a and a light sensitive copying material 24 is located at the station 24a. The illuminated transparency is imaged optically on the copy material and hence the resulting image does not depend upon the resolution of the electronic equipment of the system. Consequently, the information carried by the electronic equipment is only that of the color components of the transparency 22. As this is only a masking effect, a certain amount of unsharpness is permissible and in actuality, it has been found to be desirable. Therefore, the tolerance of the electronic equipment is not required to be as high as would be necessary if the whole image both as to the content and color were to be transmitted via electronic equipment.

The use of the three cathode-ray tubes 10, 14 and 18 provides sufficient light of the wavelengths suitable for matching the responses of the photosensitive material and also the dyes of the transparency at good signal-to-noise ratios in the electronic channels. A masked copy of the original transparency 22 can be thus produced in as little as one complete scan of the rasters of the cathode-ray tubes 10, 14 and 18. It should be noted that the invention has been described above in its simplest form and many additional variations of the method and apparatus described are possible.

For example, it is preferred that the cathode-ray tubes 10, 14 and 18 provide a complete rather than a line illumination of the transparency 22 to be copied. For this purpose, as shown in FIG. 2, high frequency wobble may be applied by wobble generator 46 to spot wobble coils 46a, 46b and 46c if such are provided in order to cause the spot to wobble along the lines of the raster. The high frequency signal applied to the spot wobble coils or other deflecting equipment may be such as to produce a square wave wobble or a sinusoidal or sawtooth wave wobble. The ideal arrangement is such that when a photographic record of any of the cathode-ray tubes 10, 14 and 18 is scanned with a microdensitometer, there is no apparent variation in density due to variations in the intensity of glow from the phosphor coating of the respective tube.

In addition to the high frequency wobble provided in the deflector apparatus of the particular tubes, a high frequency bias may be applied in unison to the signal on the cathode of the cathode-ray tubes 10, 14 and 18 by spot control means 47, seen in FIG. 2, so that the spots are switched on and off at a high frequency to give the effect of an illuminant behind a screen. The transparency 22 will, therefore, reproduce in one step, as a screened original and such method may be extremely useful in the preparation of screened separation negatives from an original.

There are circumstances when it is possible for the electronic equipment to oscillate into positive feed back. To avoid such a possibility it is preferred that the apparatus of the invention be operated in a "read-and-mask" mode. In such a mode, a signal recording means 45 must be provided in the signal lines to record the signal in each channel. The preferred location for the signal recording means is between the photomultipliers 28, 29 and 30 and the logarithmic amplifiers 31, 32 and 33. In such operation, the original is first scanned with constant light from the cathode-ray tubes 10, 14 and 18 to provide a record of the color content of the original which record is recorded in the signal recorder without a photosensitive material being located at the copying station 24 or, alternatively, with a shutter or like means interposed between the semitransparent mirror 25 and the copying station 24 and, thereafter, the photosensitive copying material is positioned at the station 24 and the recorded signals are played back through the channels, with appropriate corrections, to provide a masked illumination of the original to be reproduced on the photosensitive copying stock.

Such a "read-and-mask" mode of operation compensates, to a great extent, for the afterglow characteristics of the phosphors and for the changes in spot size which vary with varying intensity of the electron beams. The signal storage means may conveniently comprise a tape or like recorder of the kind capable of recording signals of video frequency.

Another way of avoiding the tendency which afterglow characteristics have of affecting the recorded signals is to provide the photomultipliers, or amplifiers thereof, with means for attenuating the low frequency response and the high frequency response are relatively similar. The afterglow characteristics give rise to high frequency distortions and hence attenuation of the low frequencies to the same extent as the high frequency signals, avoids to a great extent, any defects due to the afterglow characteristics of the phosphors.

In the "read-and-mask" mode of operation of the apparatus of the present invention, or even in the one step copying of an original, a further beam splitter may be provided whereby the transparency as illuminated by the masked signals from the cathode-ray tubes 10, 14 and 18 can be viewed. Alternatively, the copying station 24 may be adapted to accommodate a ground glass or similar display screen which can be interchanged with a photosensitive material holder. With this design, the masked original may first be viewed on the display screen and after positioning the photosensitive copying material at the copying station 24, an exposure may be made.

The original will normally be exposed by a single scan of the raster of the cathode-ray tubes. As a result with a conventional set of cathode-ray tubes, the original can be scanned in approximately one twenty-fifth of a second or in a subsequent one twenty-fifth of a second.

The speed and the efficiency of the method of the invention renders the above apparatus suitable for use in the copying of original cine films substandard size, for example 16 mm. The apparatus is also suitable for copying transparencies of conventional 35 mm. size, and also from the production of separation negatives from transparencies.

With modified optical arrangement, reflection prints or other opaque originals may be copied with the apparatus of the present invention. By appropriately setting of the various electronic correction stages, the apparatus of the present invention can be used for producing prints from negatives, both still and cine.

The invention has been described in detail with particular reference to preferred embodiments thereof, but it will be understood that variations and modifications can be effected within the spirit and scope of the invention as described herein and as defined herein in the claims.

I claim:

1. In an apparatus for producing color photographs of a color record on photosensitive copy material, the combination comprising:

a. a plurality of flying spot scanning devices each having a color filter positioned in front of its face;
   b. means for varying the instantaneous intensity of the filtered light emitted by each of the flying spot scanning devices;
   c. means for directing in unison the filtered light of each of the flying spot scanning devices along a predetermined path in at least first and second scansions;
   d. means for supporting the color record in the predetermined path of the filtered light;
   e. a plurality of photoelectric sensing means each arranged to sense a portion of a different color of the filtered light transmitted by the color record during a first scansion to provide respective electrical signals representative of the intensity of the transmitted light;
   f. signal storage means for storing said respective signals during said first scansion of the color record by the flying spot scanning devices;
   g. means for retrieving from said signal storage means and modifying said respective signals to correct for deficiencies in the color record and copying material in accordance with a predetermined program during a second scansion of the color record by the flying spot scanning devices;
   h. means for supporting photosensitive copying material in the path of the filtered light transmitted by the color record during said second scansion of the color record; and
   i. means for feeding back said respective modified signals to the intensity varying means of the respective flying spot scanning devices of corresponding color to vary the instantaneous intensity of the filtered light emitted thereby to mask the color record during said second scansion and produce a color corrected photographic copy therefrom.

2. The combination of claim 1 wherein a plurality of flying spot scanning devices comprise:

a. a first flying spot scanner emitting blue light;
   b. a second flying spot scanner emitting green light;
   c. a third flying spot scanner emitting red light, and in which;
   d. the filter positioned in front of the first flying spot scanner is a blue filter;
   e. the filter positioned in front of the second flying spot scanner is a green filter; and
   f. the filter positioned in front of the third flying spot scanner is a red filter.

3. The combination of claim 2 wherein the respective blue, green and red filters allow the passage of blue, green and red light of wavelengths of approximately 430 m$\mu$, 540 m$\mu$ and 620 m$\mu$, respectively.

4. The combination of claim 1 further comprising means for cyclically deflecting the filtered light emitted by each of said flying spot scanning devices transversely with respect to said predetermined path to vary the instantaneous area of the color transparency being scanned during each of said scansions.

5. The combination of claim 1 further comprising means for cyclically switching the filtered light emitted by said flying spot scanning devices on and off during a scansion.

6. The combination of claim 1 wherein the means for modifying the respective signals in accordance with a predetermined program includes means for correcting the respective signals for unwanted dye absorption in the material of the color transparency and for contrast.

7. The combination of claim 1 wherein the means for modifying the respective signals in accordance with a predetermined program include:

a. means for converting the respective signals from linear to logarithmic signals;
   b. matrix means for correcting the respective logarithmic signals for unwanted dye absorption in the material of the color transparency;
   c. means for converting the corrected logarithmic signals to linear signals;

d. second matrix means for correcting for unwanted negative absorption in the photosensitive copying material; and e. means to correct for contrast in the filtered light of the flying spot scanning devices.

8. In a method for producing a color photograph on a photosensitive surface from a color record, the steps of:
   a. directing the respective light from a plurality of flying spot scanning devices in unison through separate filters of different colors corresponding to each flying spot scanning device;
   b. scanning the color record with the filtered light in a first scansion;
   c. sensing each of the different colors of light transmitted by the color record during the first scansion;
   d. converting the sensed light to respective electrical signals representative of the instantaneous intensity of each color of the transmitted light;
   e. storing the respective electrical signals;
   f. supporting photosensitive copying material in the path of the light transmitted by the color record; and
   g. during a second scansion of the color record
      1. retrieving said respective electrical signals from storage,
      2. modifying the signals to correct for deficiencies in the color record and copying material, and
      3. employing the modified signals to control the intensity of the filtered light to mask the color record and make a color corrected photographic copy therefrom.